US00RE35426E

United States Patent [19]

Mally

[11] E Patent Number: Re. 35,426

[45] Reissued Date of Patent: Jan. 21, 1997

[54] FORMING CASINGLESS SAUSAGE AND THE LIKE

[75] Inventor: Timothy G. Mally, Oregon, Wis.

[73] Assignee: Oscar Mayer Foods Corporation, Madison, Wis.

[21] Appl. No.: 135,819

[22] Filed: Oct. 13, 1993

Related U.S. Patent Documents

Reissue of:

[64] Patent No.: 5,056,425
Issued: Oct. 15, 1991
Appl. No.: 587,839
Filed: Sep. 25, 1990

U.S. Applications:

[63] Continuation-in-part of Ser. No. 400,080, Aug. 29, 1989, Pat. No. 4,989,505, and Ser. No. 575,044, Aug. 30, 1990, Pat. No. 5,115,732.

[51] Int. Cl.[6] ..... A22C 7/00; A22C 11/00

[52] U.S. Cl. ..... 99/483; 99/353; 99/494; 99/516; 425/297; 425/373

[58] Field of Search ..... 99/353–355, 443 C, 99/356, 483, 359, 360, 371; 425/373, 297, 311, 325, 327, 332; 426/412, 513; 452/30, 50

[56] References Cited

U.S. PATENT DOCUMENTS

| | | | |
|---|---|---|---|
| 1,391,269 | 9/1921 | O'Brien . | |
| 1,651,472 | 12/1927 | Schmelz . | |
| 2,185,979 | 1/1940 | Dumas . | |
| 2,631,525 | 3/1953 | Finizie . | |
| 2,725,591 | 12/1955 | Cline et al. | 452/50 |
| 2,843,037 | 7/1958 | Waas . | |
| 2,867,000 | 1/1959 | Huszar | 425/297 |
| 2,877,118 | 3/1959 | Hensgen et al. . | |
| 2,897,745 | 8/1959 | Nichols et al. . | |
| 2,933,758 | 4/1960 | Moule | 426/513 X |
| 2,953,461 | 9/1960 | Prohaska . | |
| 2,965,491 | 12/1960 | Clemens et al. . | |
| 3,005,716 | 10/1961 | Moreland | 426/245 |
| 3,063,842 | 11/1962 | Podebradsky | 426/646 |
| 3,132,950 | 5/1964 | Macy et al. . | |
| 3,298,303 | 1/1967 | Waller . | |
| 3,456,285 | 7/1969 | Miller et al. | 452/43 |
| 3,472,156 | 10/1969 | Bardeau et al. . | |
| 3,537,385 | 11/1970 | Puschner et al. | 99/353 |
| 3,781,447 | 12/1973 | Durso | 426/513 |
| 3,834,849 | 9/1974 | Supran et al. | 425/206 |
| 3,889,013 | 5/1975 | Moule | 99/353 X |
| 3,902,388 | 9/1975 | New | 452/30 X |
| 3,916,483 | 11/1975 | Vinokur | 99/441 |
| 4,113,890 | 9/1978 | Long | 99/355 X |
| 4,207,281 | 5/1980 | Bernard . | |
| 4,258,066 | 3/1981 | Bernard . | |
| 4,280,803 | 7/1981 | Treharne | 425/99 |
| 4,294,858 | 10/1981 | Moule | 426/513 X |
| 4,379,356 | 4/1983 | Geissbuhler . | |
| 4,404,229 | 9/1983 | Treharne . | |
| 4,414,707 | 11/1983 | Koken | 452/50 |
| 4,440,701 | 4/1984 | Ohki et al. | 264/310 X |
| 4,541,976 | 9/1985 | Batigne et al. . | |

(List continued on next page.)

FOREIGN PATENT DOCUMENTS

| | | |
|---|---|---|
| 85308482 | 6/1986 | European Pat. Off. . |
| 1352152 | 1/1964 | France . |
| 2493678 | 5/1982 | France . |
| 1207234 | 12/1965 | Germany . |
| 3939035 | 5/1991 | Germany . |

*Primary Examiner*—Timothy F. Simone
*Attorney, Agent, or Firm*—Lockwood, Alex, Fitzgibbon & Cummings

[57] ABSTRACT

An apparatus is provided for processing batter materials, such as food batter, including sausage batter for wieners and the like, without incorporating the use of any casing for the batter. The apparatus forms a blank having a proteinaceous skin made by congealing surface batter materials with a treatment fluid. Each thus formed blank is ejected onto a conveyor that includes a device for completing the formation of congealed skin on the blank The thus shaped items can then be packaged and cooked within the package in order to provide an aseptic product. If desired, the items can be cooked and then packaged in order to provide a product having an acceptable shelf-life.

54 Claims, 3 Drawing Sheets

U.S. PATENT DOCUMENTS

| | | | |
|---|---|---|---|
| 4,610,844 | 9/1986 | Matthews et al. | 426/641 |
| 4,622,228 | 11/1986 | Ikeuchi et al. . | |
| 4,642,847 | 2/1987 | Ross | 426/245 |
| 4,726,093 | 2/1988 | Rogers | 99/384 |
| 4,780,328 | 10/1988 | Akesson et al. | 426/390 |
| 4,989,505 | 2/1991 | Mally . | |
| 5,115,732 | 5/1992 | Mally . | |
| 5,118,519 | 6/1992 | Mally et al. . | |
| 5,141,762 | 8/1992 | Mally . | |

FORMING CASINGLESS SAUSAGE AND THE LIKE

Matter enclosed in heavy brackets [ ] appears in the original patent but forms no part of this reissue specification; matter printed in italics indicates the additions made by reissue.

BACKGROUND AND SUMMARY OF THE INVENTION

This is a continuation-in-part of application Ser. No. 400,080, filed Aug 29, 1989, U.S. Pat. No. 4,989,505 and of application Ser. No. 575,044, filed Aug. 30, 1990, [pending] *now U.S. Pat. No. 5,115,732.*

The subject invention generally relates to an apparatus for forming batter into a shaped product without using a casing or the like. More particularly, the invention relates to an apparatus for forming a casingless shaped product, such as a casingless sausage and the like, by forming a proteinaceous skin on batter materials in order to impart and maintain an mmal shape to the batter material. A conveyor assembly, which receives the thus initially formed and shaped batter material, has an assembly for modifying the shape of at least one end of the initially shaped batter material, this shape modifying assembly imparting a generally rounded configuration to the end portion of the initially shaped batter material by virtue of relative rotational movement between a surface of this assembly and the end portion of the batter material.

Various devices are known for shaping batter materials such as sausage batter, other food product batters and the like, and stuffing the batter into a casing, which casing can complete the shaping of the batter as desired while maintaining the desired shape during further processing. Often, the further processing includes cooking or other procedure which modifies the consistency of the batter such that it will substantially maintain its desired shape. At least in the case of wieners and other sausage products, each casing is subsequently removed during processing so that the product purchased by the consumer is a so-called casingless product, even though a casing had been used during processing. Such casing removal requires a specially designed apparatus, such as the one illustrated in Koken U.S. Pat. No. 4,414,707.

Various devices have been proposed for forming and processing sausages and the like without using casings. One suggested approach has been to form and cook a food batter within an elongated tube which has endshaping plugs periodically spaced therewithin, as iilustrated in U.S. Pat. No. 4,113,890. This requires a continuous inserting of the batter and plugs into the tube and a removal of the plugs and cooked batter out of the tube. Another patent, Rogers U.S. Pat. No. 4,726,093, proposes making food products such as skinless sausages through the use of a genes of plugs that engage a tube vnthin which the batter is cooked.

Another suggested approach is to use a plurality of hollow molding tubes that tre conveyed sequenttally through an endless path. Geissbuhler U.S. Pat. No. 4,379,356 proposes the use of a plurality of molds having an open end such that sausage material will expand out of the tube and, this patent suggests, be formed into rounded sausage ends when each molding tube is conveyed through a heating zone, which is shown as a hot water bath.

In another proposal, sausages are shaped within fully enclosed molds. each having a permeable wall through which an edible acid is introduced. Treharne U.S. Pat. No. 4,280,803 and U.S. Pat. No. 4,404,229, incorporated by reference hereinto, show such a system wherein the edible acid is said to react with protein in a meat or meat-like material within the molds to form a cohesive surface.

Suggestions in the art as are exemplified by these patents call for shaping of a batter-originating product within a tube or mold and thereafter removing the finally shaped product from the mold, and typically from a plurality of mold cavities or a mold cavity having a plurality of molding locations. Proposals of this general category tend to require complicated apparatus features, often including a complex molding structure having various moving parts and/or multiple components, which at times must be accurately indexed and/or aligned with respect to each other.

By proceeding in accordance with the present invention, batter such as sausage batter and the like is transformed into a shaped product such as a sausage or the like without having to form that product within a casing and subsequently remove and discard the casing. An apparatus as provided wherein the batter as stuffed into a shaped cavity having means for treating the surface of the batter in order to thereby form a proteinaceous skin or hide, which skin or hide holds the batter together and imparts to it a preliminary shape which approximates the desired final shape of the product. Preferably, this treating means utilizes food grade acid to form the skin or hide. This preliminarily shaped product, or blank, is removed from the molding usembly and deposited on a conveyor for further shaping into the desired end product. In an illustrated embodiment, the conveyor includes a rotating end forming assembly for engaging at least one end of the initially shaped batter blank into a generally rounded configuration by relative rotational movement between the blank and the end forming assembly. Typically, an assembly also is provided whereby elongated peripheral pressure is imparted to the blank in order to facilitate movement of the batter toward and into engagement with the rotating end forming assembly.

It is a general object of the present invention to provide an improved apparatus for transforming batter into shaped products without utilizing casings or the like.

Another object of the present invention is to provide an improved apparatus that includes forming at least a portion of a batter-originating product with an assembly which does not include a product-conforming mold.

Another object of this invention is to provide an improved apparatus for making casingless food products that can be cooked and then packaged.

Another object of the present invention is to provide an improved apparatus for forming casingless products that can be packaged and then aseptically cooked within the package.

Another object of this invention is to provide an improved sausage-making apparatus which is of an especially simplified construction.

Another object of the present invention ts to provide a sausage-making apparatus which reduces the cost of utilities when compared with conventional casing utilizing systems.

Another object of the present invention is to provide an apparatus for making sausages and the like that does not require any casing removal devices.

These and other objects, features and advantages of the present invention will be clearly understood through a consideration of the followed detailed description.

BRIEF DESCRIPTION OF THE DRAWINGS

In the course of this description, reference will be made to the attached drawings, whereto.

DESCRIPTION OF PARTICULAR EMBODIMENTS

Figure 1:
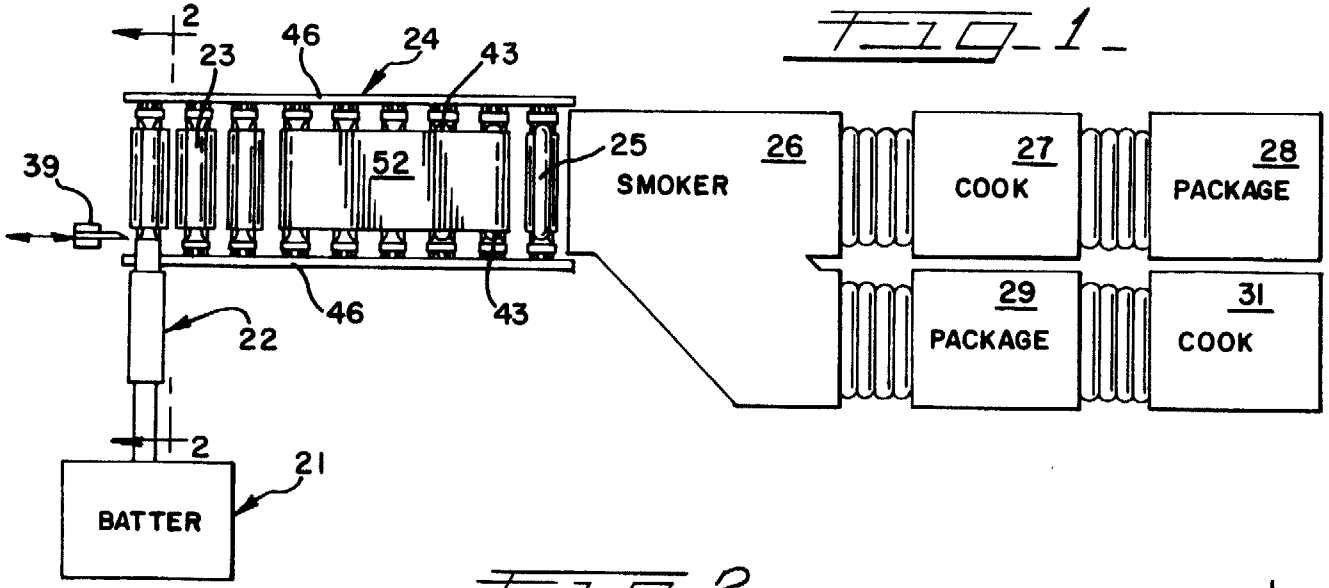
FIG. 1 is a top plan view of a sausage processing line incorporating features according to the present invention.

FIG. 1 illustrates a layout for a sausage processing line incorporating the present invention. A batter preparation apparatus 21 includes mixing and feeding assemblies of generally known construction by which components such as sausage ingredients are combined and blended to desired product identity, consistency, taste and the like into a pumpable batter. Batter preparation apparatus 21 feeds into a stuffing and shaping apparatus 22, which is illustrated in greater detail in FIGS. 3 and 4. The stuffing and shaping apparatus 22 or horn assembly ejects partially shaped products or blanks 23 onto a conveyor assembly, generally designated as 24. Preferably, conveyor assembly 24 completes formation of the blanks 23 into uncooked products 25.

Uncooked products 25 can then be processed as needed or desired. For example, sausage products 25 can be flavored in a smoker apparatus 26, which can be of generally known construction. FIG. 1 illustrates cooking and packaging arrangements which can be utilized or eliminated as desired. A cooking apparatus 27 can precede a packaging apparatus 28, typically of generally known construction. An alternative packaging apparatus 29 and cooking apparatus 31 can be provided, as discussed in greater detail hereinafter.

Figure 2:
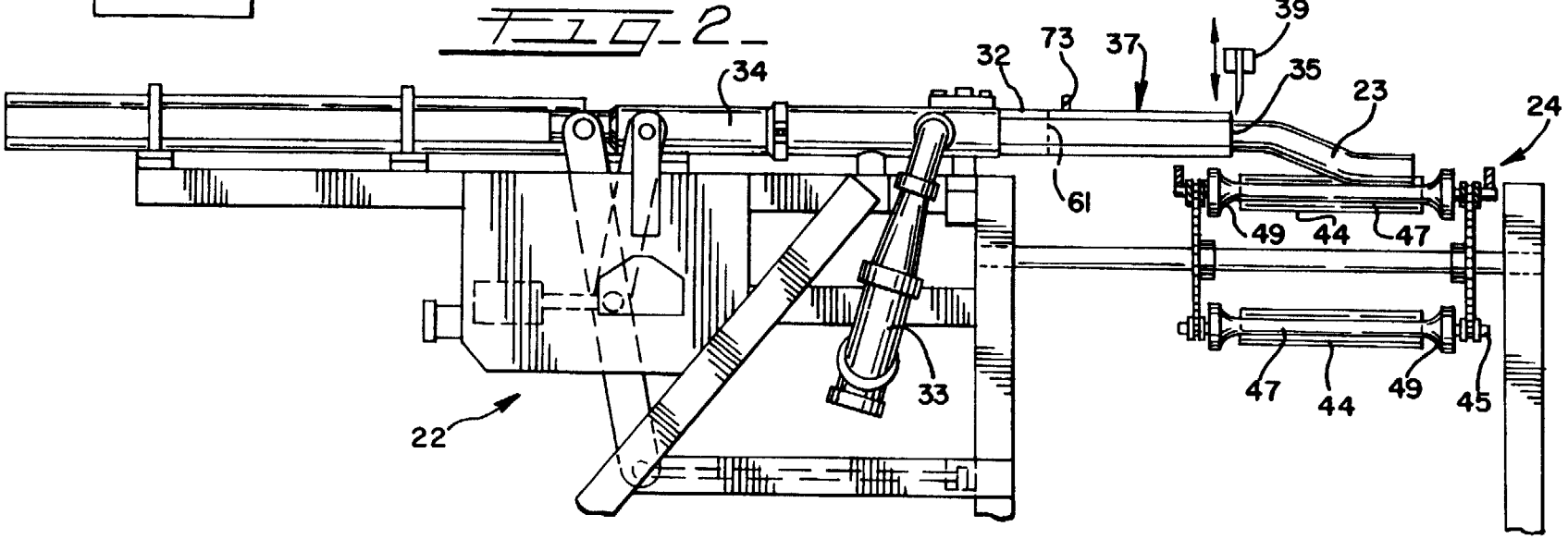
FIG. 2 is an enlarged, primarily elevational detail view, generally taken along the line 2—2 of FIG. 1.

With more particular reference to the stuffing and shaping apparatus or horn assembly 22, same includes a molding compartment, such as the illustrated tube 32. Batter from the batter preparation apparatus 21 is pumped to the molding compartment 32 through suitable equipment such as that including the illustrated stuffer supply assembly 33. A suitable ejection mechanism, for example the piston or ram mechanism 34 illustrated in FIG. 2. will eject the partially shaped products or blanks 23 out of an open end 35 of the molding component 32. In the embodiment illustrated in the drawings, a single blank 23 is formed during each cycle of the apparatus, although it will be appreciated that multiple product blank formation or generally continuous product blank formation could be carried out by appropriately modifying the equipment.

In a preferred embodiment of the invention which is shown in the drawings, the inside diameter of tube 32 is slightly larger than the desired outside diameter of the finished product. This is due to the slight reduction in size of the blank 23 which is carried out on the preferred conveyor assembly 24 as discussed elsewhere herein When desired, a plurality of elongated wires 36 may be included within the molding compartment 32 in order to generally longitudinally orient hide fibers or other components of the pumped batter.

A treating assembly, generally designated as 37, is associated with the moldrag compartment 32. When the molding compartment Is generally tubular in shape, it is preferred that the tubular inside surface of the treating assembly 37 have a generally circumferential fluid introducer therealong, such as the illustrated circular orifice 61 in order to thereby treat the pumped batter passing through the tubular inside surface of the molding compartment 32 with a suitable treating fluid. Batter passing through the tube on a continuous flow basis is thereby surface treated or congealed in order to form a proteinaceous skin or hide of batter material. A typical skin in this regard is on the order of about 0.020 to about 0.050 inch thick. Treating assembly 37 will typically be able to form this proteinaceous skin dunng a very short time period, typically on the order of about the one to two seconds required to pass the batter through the treating assembly 37. Conditions such as these are typically suitable when the batter material is a sausage batter.

Figure 8:
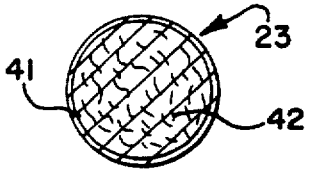
FIG. 8 is a cross-sectional view along the line 8—8 of FIG. 6.

Means are provided for severing the batter into the partially shaped products or blanks 23. For example, a knife assembly 39 ts shown positioned at a location which is closely spaced from the open end 35 of the molding compartment 32. The thus severed blanks 23, which are most conveniently deposited directly onto the conveyor assembly 24, include a proteinaceous skin 41 (FIG. 8) which performs a function on the order of that performed by a casing required of material processed on previously used equipment and maintains the desired general shape (such as the illustrated elongated cylinder) of the blank 23. Each blank 13 also includes a core portion 42, which is essentially raw batter. Each blank 23 has enough integrity in order to be handled for further processing.

Figure 4:
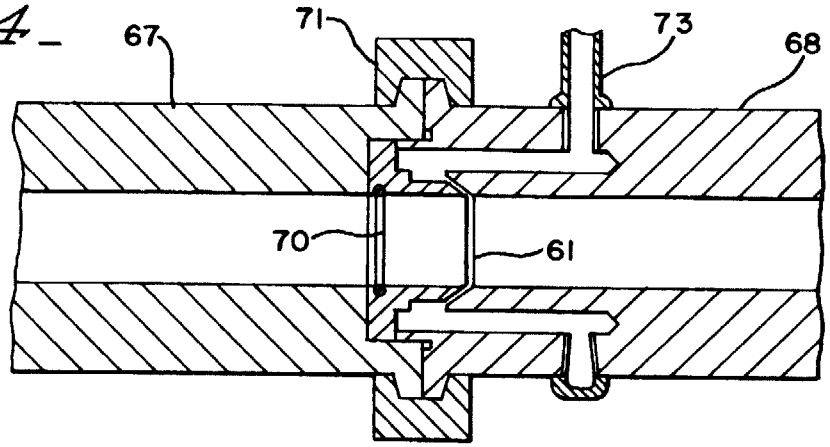
FIG. 4 is an enlarged detail view of a portion of the treating means illustrated In FIG. 3.
Figure 3:
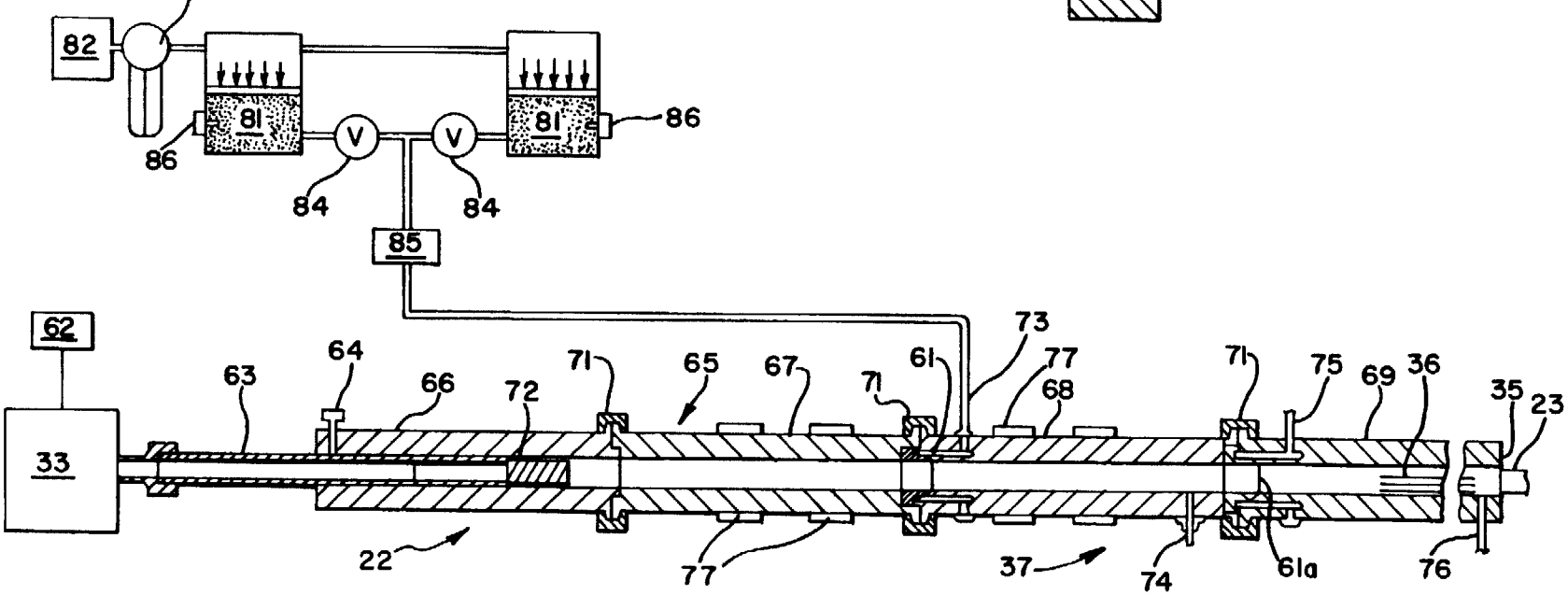
FIG. 3 is a cross-sectional view of a preferred embodiment of the treating means component shown in FIG. 2.
Figure 5:
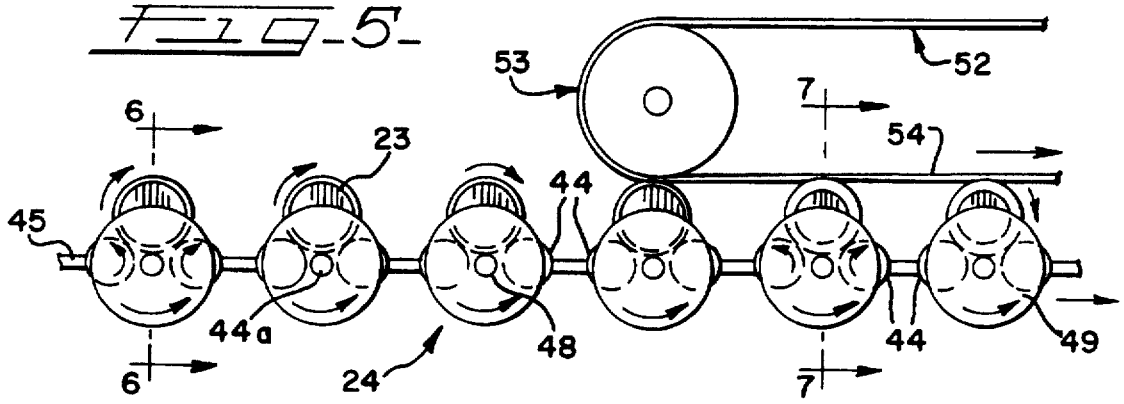
FIG. 5 is an elevanonai view of a shaping conveyor assembly according to the invention.
Figure 6:
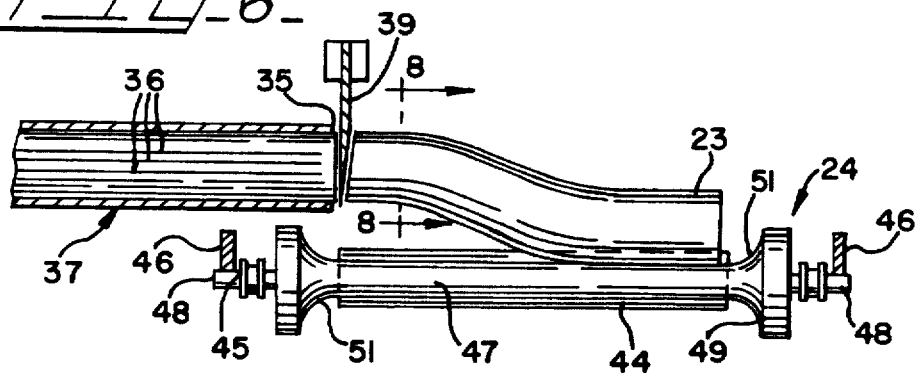
FIG. 6 is an enlarged, generally cross-sectional view substantially along the line 6—6 of FIG. 5.
Figure 7:
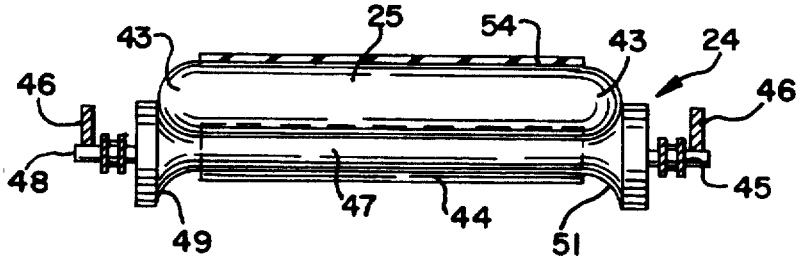
FIG. 7 is an enlarged, generally cross-sectional view substantially along the line 7—7 of FIG. 5.

Specifically refernng to the horn assembly 22 that is illustrated in the drawings, especially FIGS. 3 and 4, a pressure transducer 62 imparts the proper pressure conditions to the stuffer supply assembly 33 for passing the batter through the horn assembly 22. Horn assembly 22 includes a horn 63 secured by an attachment means, such as the illustrated thumb screw 64, to a tube, generally designated as 65. If desired tube 65 can be an assembly of tubular members 66, 67, 68, 69 joined by appropriate means such as clamps 71 securing together flared ends of the tubular members. Horn 63 has a tip 72, for directing the batter into the tube 65.

Treating assembly 37 includes at least one orifice 61 opening into the tube 65. The illustrated orifice 61 is circular and, as previously stated, is the passageway through which the treating fluid flows into the tube 65. A conduit assembly 73 supplies pressurized treating fluid to the orifice 61. An O-ring acid wiper 70 and heaters 77 can be included. if desired, a recirculation conduit assembly 74 also can be included in order to recycle the treating fluid. Tube 65 can also include another orifice 61a and a conduit assembly 75 downstream of the treating fluid orifice 61, and another recirculation conduit assembly 76 can be incorporated as well.

Details of a suitable arrangement for supplying treating fluid to the conduit assembly 73 are given in FIG. 3. Treating fluid. typically a food grade acid, is stored within reservoirs 81 of the type within which air pressure is imparted theretfrom an air supply 82 and a regulator 83. When desired. the fluid can be heated by suitable heaters 86, either within the reservoirs 81 or at any other suitable location, Valves 84 and a pressure transducer 85 regulate flow of fluid out of the reservoirs 81 and to the orifice 61.

A continuous flow of batter proceeds through the horn assembly 22 and treating assembly 37, and a continuous sausage, weiner or the like is formed with a continuous hide or proteinaceous skin 41 on the surface thereof. Thus, each horn assembly 22 and treating assembly 37 unit is able to provide superior throughput as the batter continuously flows therethrough.

When all of the treating fluid orifice 61, the rinsing fluid orifice 61a. and the conduit assemblies 73, 74, 75 and 76 are incorporated into the treatrag assembly 37, the operation proceeds in the following manner. Pressurized and warm treating fluid, typically a food grade acid solution, enters through orifice 61 and contacts the outside surface of the flowing batter, with the length of tubular member 68 being adequate to achieve a hide set. Any excess treating fluid can be recycled through conduit 74, typically near the downstream end of tubular member 68. Rinsing fluid, such as water or a food grade basic solution, cycles through tubular member 69 from conduit assembly 75 to downstream conduit assembly 76. Typically adequate fluid flow is achieved under usual conditions when the orifices 61, 61a provide a very narrow gap, on the order of 0.015 inch or less. Vinegar provides an acceptable food grade acid treating fluid.

Referring more specifically to the conveyor assembly 24, it is capable of receiving a plurality of partially shaped products or blanks 23 and conveying them for shaping into the uncooked products 25. The preferred conveyor assembly 24 preferably includes an assembly for applying inwardly directed pressure onto the exterior periphery of each blank 23 in order to thereby exert a generally compressive, moderate force onto the blank.

As a result, raw batter of the core portion 42 of each blank spreads generally outwardly. In the illustrated generally cylindrical products, the raw bailer moves substantially longitudinally and outwardly, and this raw batter is then formed into generally finished ends 43 in which the proteinaceous skin 41 thereby substantially completely envelopes the core portion of raw batter 42.

The illustrated conveyor assembly 24 includes a plurality of generally parallel rollers 44 which are secured to a chain assembly 45. The chain assembly 45 will typically take the form of an endless eonveyor which includes a run that receives the blanks 23 and conveys them away from the stuffing and shaping apparatus 22. Rollers 44 are spaced such that a pair of them support and rotate a blank 23. Smaller, intermediate rollers 44a can be spaced between these roller pairs, as needed or desired to properly support the blanks 23. Preferably, some or all of the rollers are driven, for example by rolling engagement with a rail 46, or by any other suitable rotation-imparting mechanism. Any suitable arrangement for driving the rollers can be utilized, provided the rollers can be driven while the chain assembly 45 traverses its conveyed pathway. Rotation of the rollers assists in maintaining a substantially round cross section to each blank 23 and in minimizing the formation of any processing marks thereon.

Conveyor assembly 24 further includes a plurality of forming rollers 47, preferably also rotatably mounted to the chain assembly 45. Rotational driving of each forming roller 47 can be accomplished in substantially the same manner as is achieved for rollers 44 and/or 44a; for example, rod extensions 48 can engage the rail 46. Preferably, each forming roller 47 is in continuous rotating engagement with at least a portion of each of the blanks 23. Forming rollers 47 include end flanges 49. Illustrated end flanges 49 include a surface which, when rotated during engagement with batter flowing from the blanks 23, will shape that batter into the desired shape of a generally finished end 43. In the illustrated embodiment, this is accomplished by a curved, flared spool-like surface 51. When the end flange 49 rotates, the curved, flared surface 51 provides a continuous curved (typically semicircular) shaping edge. Preferably, at least the end flange 49 of each forming roller includes treating means so that the generally concave shaping edge of each curved flared surface 51 will form the hide or proteinaceous skin 41 over the generally finished ends 43 of the uncooked products 25. Typically, treating fluids of the same type discussed herein with respect to the treating assembly 37 will achieve the desired degree of skinning over at the surface 51.

In order to insure that the batter 42 will efficiently and quickly flow beyond the initially formed end of each blank 23, a squeeze assembly 52 for exerting pressure onto each blank 23 is positioned in generally opposing relationship to the chain assembly 45. The illustrated squeeze assembly 52 includes an overhead conveyor assembly 53 which has a substantially flat belt 54 that engages each blank 23, which blank is then compressed or squeezed between the belt 54 and the roller pair 44 and forming roller 47 associated with that particular blank 23. Preferably, belt 54 is not precisely parallel to the chain assembly 45, but the space between the roller chain assembly 45 and the flat belt 54 gradually decreases in the downstream direction. The extent of this decrease or taper need not be substantial. For example, for a typical wiener, the decrease need be only on the order of approximately 1 millimeter in order to ensure proper formation of the generally finished ends 43. In other words, for a typical wiener, the diameter of the uncooked product 25 is on the order of approximately 1 millimeter less than the diameter of the blank 23.

When provided, the smoker apparatus 26 can include a smoke chamber of generally known construction. Particularly efficient smoking can be practiced inasmuch as the uncooked products 25 do not have a casing, which would otherwise have to be penetrated by the smoke media when other devices are used. Facilities could also be provided for the utilization of liquid smoke or other flavoring components or devices. Uniformity of smoke application can be enhanced by continuing the roller conveyor into and through the smoker apparatus 26.

Concerning the combination illustrated in FIG. 1 of the cooking apparatus 27 followed by the packaging apparatus 28, the conveyor assembly 24 can continue into the cooking apparatus 27 an order to undergo generally conventional cooking procedures. Exemplary heating procedures would include oven heating, convection heating and/or microwave heating. The thus cooked products are then transferred to a packaging apparatus of a generally known type. By this procedure, a vacuum packaged grouping of casingless products, such as wieners, are provided, and these packaged products will have a shelf-life of an acceptable length.

Because the uncooked products 25 can be handled, at least to a certain extent, prior to cooking them, and because there is no casing that needs to be removed after cooking, it is possible to package the uncooked products 25 in the alternative packaging apparatus 29. Generally speaking. these uncooked products 25 are packaged in a substantially raw state. Subsequent cooking in the alternative cooking apparatus 31 is carried out after packaging, thereby enabling the formation of an aseptic package of the desired products, such as wieners, other sausages, or the like. The alternative cooking apparatus 31 would typically include a hot-water cooking bath, a hot platter cooking apparatus, or the like. By utilizing this apparatus to form an aseptic package, subsequent treatments to enhance shelf-life. such as temperature reduction devices, can be eliminated.

While particular embodiments of the invention have been described, it will be apparent to those skilled in the art that various modifications thereof may be made without departing from the true spirit and scope of the invention. Accordingly, it is intended by the appended claims to cover all such modifications and equivalents which embody the inventive features as defined in the claims.

I claim:

1. An apparatus for forming a casingless sausage comprising:

means for stuffing and shaping flowable batter material;

treating means associated with said stuffing and shaping means, said treating means being for contacting the flowable batter material with a treatment fluid and for thus forming a proteinaceous skin of batter material from the batter material of the stuffing and shaping means;

ejecting means for removing a blank from the stuffing and shaping means, the blank having a shape determined by said stuffing and shaping means, the blank further having an external surface including the proteinaceous skin and a core portion including batter material which has not been formed into the proteinaceous skin; and conveyor means for receiving and conveying the blank, said conveyor means including end forming means for engaging batter material at at least one end of the blank and for shaping the end batter material into a generally rounded configuration by relative rotational movement between the blank and the end forming means to thereby form a shaped product.

2. The apparatus according to claim 1, wherein said end forming means includes a rotatable roller having an end flange with a curved flared surface that rotatably engages batter material at the at least one end of the blank.

3. The apparatus according to claim 1, wherein said end forming means includes treating means for forming a proteinaceous skin from the end batter material.

4. The apparatus according to claim 3, wherein the treating means of the end forming means contacts said end of the blank with a treatment fluid to form the end proteinaceous skin.

5. The apparatus according to claim 1, further including squeeze assembly which is positioned generally opposite to said conveyor means such that the blank engages both the conveyor means and the squeeze assembly.

6. The apparatus according to claim 5, wherein the squeeze assembly and the conveyor means are spaced apart by a distance approximating the height of the blank, and the distance tapers gradually downwardly in the downstream direction of the conveyor means, whereby the blank is subjected to squeezing forces when it moves between the squeeze assembly and the conveyor means.

7. The apparatus according to claim 5, wherein said end forming means includes a rotatable roller having an end flange with a curved flared surface that rotatably engages batter material at the at least one end of the blank, and the squeeze assembly and the conveyor means cooperate to squeeze batter material from the blank and into engagement with said end flange of the end forming means.

8. The apparatus according to claim 7, wherein said end forming means includes treating means for forming a proteinaceous skin from the end batter material.

9. The apparatus according to claim 1, wherein said end forming means includes a rotatable roller having an end flange with a generally concave surface that engages the batter material at the at least one end of the blank, and wherein said concave surface imparts a treatment fluid to the batter and forms a proteinaceous skin from the end batter material.

10. The apparatus according to claim 9, further including a squeeze assembly which is positioned generally opposite to said conveyor means such that the blank engages both the conveyor means and the squeeze assembly, and the squeeze assembly and the conveyor means cooperate to squeeze batter material from the blank and into engagement with said end flange of the end forming means.

11. The apparatus according to claim 1, wherein said conveyor means includes a plurality of rollers, and wherein the blank is supported by at least a pair of said rollers.

12. The apparatus according to claim 11, wherein said rollers rotate the blank.

13. The apparatus according to claim 1, wherein said means for stuffing and shaping flowable batter provides a continuous flow of batter, and a knife assembly is provided for severing the continuous flow of batter into the blanks, said knife assembly being downstream of said treating means.

14. The apparatus according to claim 1, further including an overhead flat belt conveyor positioned generally above said conveyor means at a distance whereby the blank is subjected to a moderate squeezing force when moving between the overhead flat belt conveyor and said conveyor means.

15. The apparatus according to claim 1, wherein said treating means includes an orifice within the stuffing and shaping means. and the treatment fluid flows through said orifice and onto the external surface of batter material which flows through the stuffing and shaping means.

16. The apparatus according to claim 15, wherein said stuffing and shaping means includes a tubular member through which the batter material flows, and wherein said orifice is a circular slot through the tubular member.

17. The apparatus according to claim 15, wherein said treating means is for injecting a pressurized food grade acid solution as the treatment fluid.

18. The apparatus according to claim 15, wherein said treating means is associated with heating means and pressurization means for injecting a heated pressurized food grade acid solution as the treatment fluid.

19. The apparatus according to claim 15, wherein said treating means includes another orifice, said another orifice being downstream of said orifice through which treatment fluid flows, and a nnsing fluid flows through said another orifice and onto the external surface of batter material which had been treated with the treatment fluid.

20. The apparatus according to claim 1, wherein said conveyor means continues into a means for cooking the shaped product.

21. The apparatus according to claim 1, further including packaging means for inserting the shaped product into a package and means are provided downstream of said packaging means for cooking the shaped product while it is within the package.

22. An apparatus for forming a casingless sausage, comprising:

means for stuffing and shaping flowable batter material, said stuffing and shaping means having a generally tubular interior surface;

treating means associated with said stuffing and shaping means, said treating means being for contacting the flowable batter material with a treatment fluid and for thus forming a generally cylindrical proteinaceous skin or batter material from the batter material of the stuffing and shaping means, said treating means including a generally circular orifice through which the treatment fluid flows;

ejecting means for removing a generally cylindrical blank from the stuffing and shaping means, the blank having an external surface including the proteinaceous skin and a generally cylindrical core portion including batter material which has not been formed into the proteinaceous skin; and conveyor means for receiving and conveying the blank, said conveyor means including end forming means for rotatably engaging batter material at at least one end of the blank and for shaping the end batter material into a generally domed configuration by relative rotational movement between the blank and the end forming means to thereby form a product having a sausage-like shape.

23. The apparatus according to claim 22, wherein said end forming means includes a rotatable roller having an end flange with a generally concave curved flared surface that rotatably engages batter material at the at least one end of the blank. and said end forming means includes treating means for forming a proteinaceous skin having said generally domed configuration by contacting said end of the blank with a treatment fluid.

24. The apparatus according to claim 23, further including a squeeze assembly which is positioned generally opposite to said conveyor means such that the blank engages both the conveyor means and the squeeze assembly, and the squeeze assembly and the conveyor means cooperate to squeeze batter material from the blank and into engagement with said end flange of the end forming means.

25. The apparatus according to claim 22, further including an overhead flat belt conveyor positioned generally above said conveyor means at a distance whereby the blank is subjected to a moderate squeezing force when moving between the overhead flat belt conveyor and said conveyor means.

26. The apparatus according to claim 22, further including packaging means for inserting the sausage-like shaped product into a package and means are provided downstream, of said packaging means for cooking the shaped product while it is within the package.

*27. An apparatus for forming a casingless sausage comprising:*

*means for stuffing and shaping flowable batter material;*

*treating means associated with said stuffing and shaping means, said treating means being for contacting the flowable batter material with a treatment fluid and for thus forming a proteinaceous skin of batter material from the batter material of the stuffing and shaping means;*

*ejecting means for removing a blank from the stuffing and shaping means, the blank having a shape determined by said stuffing and shaping means, the blank further having an external surface including the proteinaceous skin and a core portion including batter material which has not been formed into the proteinaceous skin; and*

*conveyor means for receiving and conveying the blank, said conveyor means including an end forming assembly for engaging batter material at at least one end of the blank and for shaping the end batter material into a generally rounded configuration to thereby form a shaped product having an end portion with a generally rounded configuration.*

*28. The apparatus according to claim 27, wherein said end forming assembly includes treating means for forming a proteinaceous skin from the end batter material.*

*29. The apparatus according claim 28, wherein the treating means of the end forming assembly contacts said end of the blank with a treatment fluid to form the end proteinaceous skin.*

*30. The apparatus according to claim 27, further including a squeeze assembly which is positioned generally opposite to said conveyor means such that the blank engages both the conveyor means and the squeeze assembly.*

*31. The apparatus according to claim 30, wherein the squeeze assembly and the conveyor means are spaced apart by a distance approximating the height of the blank, and the distance tapers gradually downwardly in the downstream direction of the conveyor means, whereby the blank is subjected to squeezing forces when it moves between the squeeze assembly and the conveyor means.*

*32. The apparatus according to claim 27, wherein said end forming assembly includes a generally concave surface that engages the batter material at the at least one end of the blank, and wherein said concave surface imparts a treatment fluid to the batter and forms a proteinaceous skin from the end batter material.*

*33. The apparatus according to claim 32, further including a squeeze assembly which is posiitoned generally opposite to said conveyor means such that the blank engages both the conveyor means and the squeeze assembly, and the squeeze assembly and the conveyor means cooperate to squeeze batter material from the blank and into engagement with said end forming assembly.*

*34. The apparatus according to claim 27, wherein said conveyor means includes a plurality of rollers, and wherein the blank is supported by at least a pair of said rollers, and said rollers rotate the blank.*

*35. The apparatus according to claim 27, wherein said means for stuffing and shaping flowable batter provides a continuous flow of batter, and a knife assembly is provided for severing the continuous flow of batter into the blanks, said knife assembly being downstream of said treating means.*

*36. The apparatus according to claim 27, wherein said treating means includes an orifice within the stuffing and shaping means, and the treatment fluid flows through said orifice and onto the external surface of batter material which flows through the stuffing and shaping means.*

*37. The apparatus according to claim 26, wherein said stuffing and shaping means includes a tubular member through which the batter material flows, and wherein said orifice is a slot through the tubular member.*

*38. The apparatus according to claim 36, wherein said treating means is associated with heating means and pressurization means for injecting a heated pressurized food grade acid solution as the treatment fluid.*

*39. The apparatus according to claim 36, wherein said treating means includes another orifice, said another orifice being downstream of said orifice through which treatment fluid flows, and a rinsing fluid flows through said another orifice and onto the external surface of batter material which had been treated with the treatment fluid.*

*40. The apparatus according to claim 27, wherein said conveyor means continues into a means for cooking the shaped product.*

*41. The apparatus according to claim 27, further including packaging means for inserting the shaped product into a package and means are provided downstream of said packaging means for cooking the shaped product while it is within the package.*

*42. An apparatus for forming a casingless sausage comprising:*

*means for stuffing and shaping flowable batter material;*

*treating means associated with said stuffing and shaping means, said treating means being for contacting the flowable batter material with a treatment fluid and for thus forming a proteinaceous skin of batter material from the batter material of the stuffing and shaping means;*

*ejecting means for removing a blank from the stuffing and shaping means, the blank having a shape determined by said stuffing and shaping means, the blank further having an external surface including the proteinaceous skin and core portion including batter material which has not been formed into the proteinaceous skin; and*

*a conveyor assembly downstream of said stuffing and shaping means, said conveyor assembly receiving and conveying the blank, an end forming assembly downstream of said ejecting means, said end forming assembly engages at least one end of the blank and shapes the end batter material thereof into a generally rounded configuration to thereby form a shaped product.*

*43. The apparatus according to claim 42, wherein said end forming assembly includes treating means for forming a proteinaceous skin from the end batter material.*

*44. The apparatus according claim 43, wherein the treating means of the end forming assembly contacts said end of the blank with a treatment fluid to form the end proteinaceous skin.*

*45. The apparatus according to claim 42, further including a squeeze assembly which is positioned generally opposite to said conveyor assembly such that the blank engages both the conveyor assembly and the squeeze assembly.*

*46. The apparatus according to claim 45, wherein the squeeze assembly and the conveyor assembly are spaced apart by a distance approximating the height of the blank, and the distance tapers gradually downwardly in the downstream direction of the conveyor assembly, whereby the blank is subjected to squeezing forces when it moves between the squeeze assembly and the conveyor assembly.*

*47. The apparatus according to claim 42, wherein said end forming assembly includes a generally concave surface that engages the batter material at the at least one end of the blank, and wherein said concave surface imparts a treatment fluid to the batter and forms a proteinaceous skin from the end batter material.*

*48. The apparatus according to claim 47, further including a squeeze assembly which is positioned generally opposite to said conveyor assembly such that the blank engages both the conveyor assembly and the squeeze assembly, and the squeeze assembly and the conveyor assembly cooperate to squeeze batter material from the blank and into engagement with said end forming assembly.*

*49. The apparatus according to claim 42, wherein said conveyor assembly includes a plurality of rollers, and wherein the blank is supported by at least a pair of said rollers, and said rollers rotate the blank.*

*50. The apparatus according to claim 42, wherein said means for stuffing and shaping flowable batter provides a continuous flow of batter, and a knife assembly is provided for severing the continuous flow of batter into the blanks, said knife assembly being downstream of said treating means.*

*51. The apparatus according to claim 42, wherein said treating means is associated with heating means and presurization means for injecting a heated pressurized food grade acid solution as the treatment fluid.*

*52. The apparatus according to claim 42, wherein said treating means includes an orifice which is within the stuffing and shaping means and through which the treatment fluid flows; and said treating means includes another orifice, said another orifice being downstream of said orifice through which treatment fluid flows, and a rinsing fluid flows through said another orifice and onto the external surface of batter material which had been treated with the treatment fluid.*

*53. The apparatus according to claim 42, wherein said conveyor assembly continues into a means for cooking the shaped product.*

*54. The apparatus according to claim 42, further including packaging means for inserting the shaped product into a package and means are provided downstream of said packaging means for cooking the shaped product while it is within the package.*

* * * * *